United States Patent [19]

Haneishi

[11] Patent Number: 4,603,955
[45] Date of Patent: Aug. 5, 1986

[54] DATA TRANSMISSION BETWEEN INTERCHANGEABLE LENS AND A CAMERA BODY

[75] Inventor: Yasuyuki Haneishi, Tokyo, Japan

[73] Assignee: Asahi Kogaku Kogyo Kabushiki Kaisha, Tokyo, Japan

[21] Appl. No.: 692,730

[22] Filed: Jan. 18, 1985

[30] Foreign Application Priority Data

Jan. 20, 1984 [JP] Japan ............................ 59-5307[U]
Jan. 23, 1984 [JP] Japan ............................ 59-6316[U]

[51] Int. Cl.$^4$ ............................................ G03B 17/00
[52] U.S. Cl. .................................................. 354/286
[58] Field of Search ................. 354/455, 286, 289.1, 354/289.12; 350/257

[56] References Cited

U.S. PATENT DOCUMENTS 4,357,089 11/1982 Okura et al. ..................... 354/286
4,457,608 7/1984 Komoto et al. ................... 354/286

*Primary Examiner*—William B. Perkey
*Attorney, Agent, or Firm*—Christie, Parker & Hale

[57] ABSTRACT

A camera has a camera body with an electrically conductive camera mount and an interchangeable lens with a lens mount. The lens mount is secured to the camera body by rotation of the lens mount relative to the camera body with flat surfaces of the lens mount and the camera mount in abutting relationship. A first electrical contact in the lens mount is movable normal to the flat surface thereof. A spring urges the first contact out of the flat surface of the lens mount. A stationary second electrical contact in the camera mount opens toward the flat surface thereof without protrusion in alignment with the first contact when the lens mount is secured to the camera mount so the first contact normally bears against the second contact. The second contact is insulated from the camera body. The second contact is alternately connected and disconnected electrically to and from the camera mount through the first contact. A plurality of third contacts in the camera mount are movable normal to the flat surface thereof. Springs individually urge the third contacts out of the flat surface of the camera mount. One or more stationary insulative regions in the lens mount open toward the flat surface thereof without protrusion in alignment with one or more of the respective third contacts so the one or more of the respective third contacts bear against the respective one or more insulative regions when the lens mount engages the camera mount. Responsive to rotation of the lens mount as the lens mount is secured to the camera mount, foreign matter is wiped from the second contact, preferably by an insulative surface on the lens mount that bears against the second contact ahead of the first contact in the path of rotation of the lens mount.

18 Claims, 17 Drawing Figures

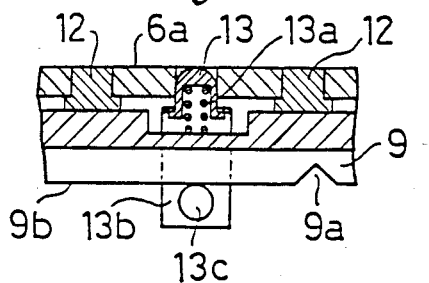
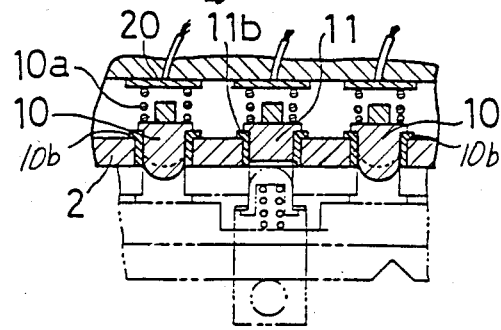
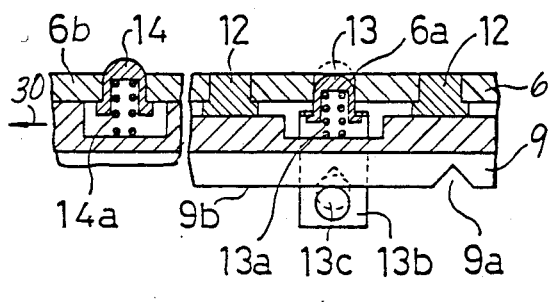
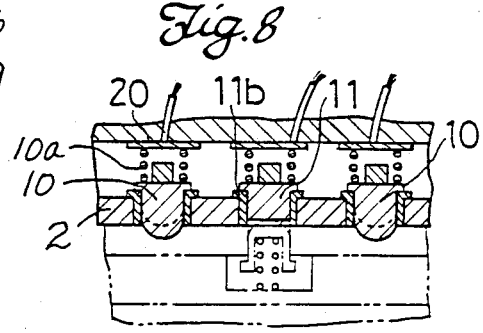
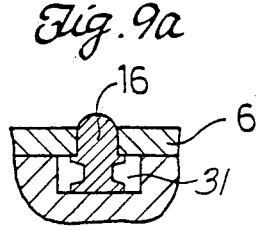
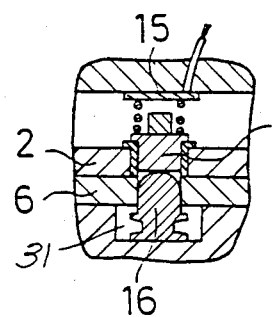
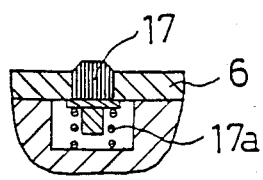
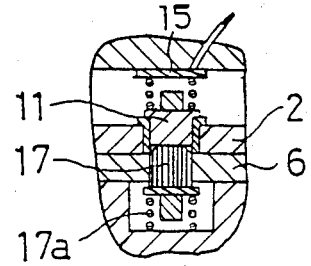

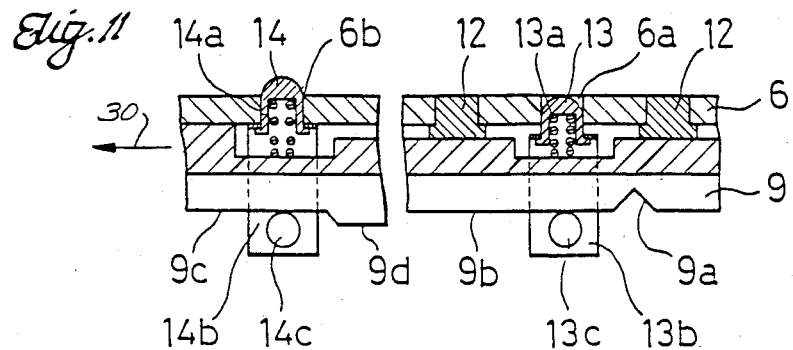
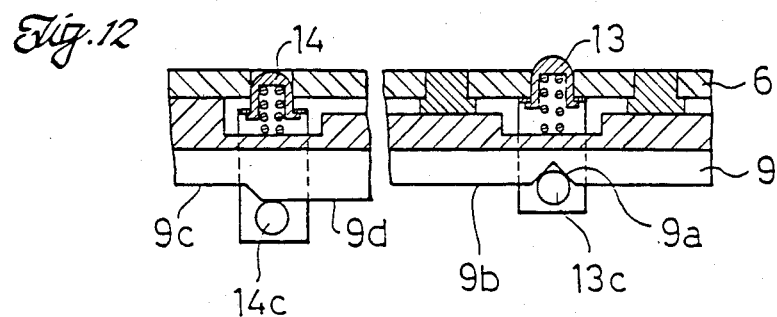
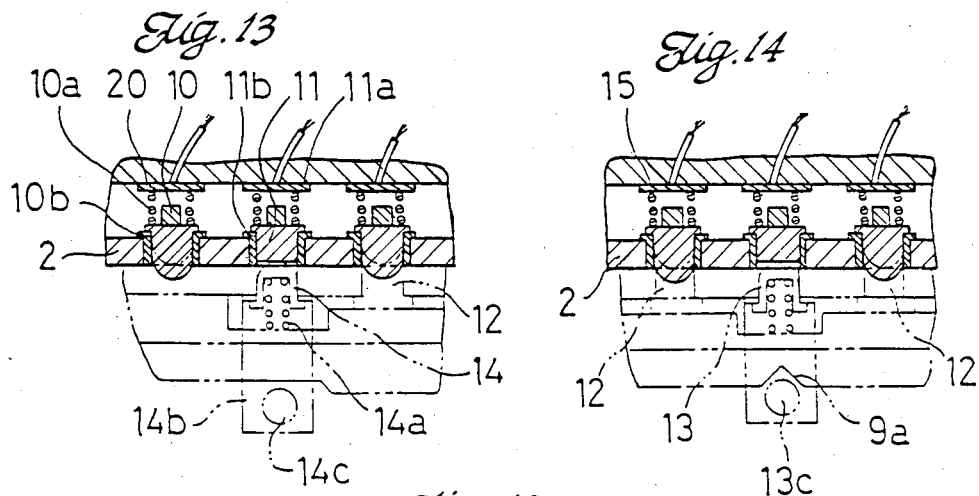
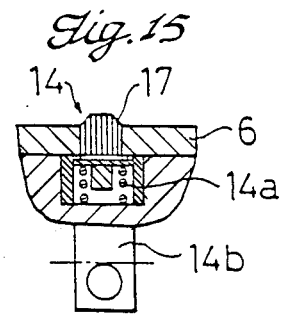

DATA TRANSMISSION BETWEEN INTERCHANGEABLE LENS AND A CAMERA BODY

FIELD OF THE INVENTION

The present invention relates to camera mounts including electrical contacts and, more particularly, to such camera mounts so constructed that any foreign substances, such as fragments of insulator, possibly deposited on the electrical contacts can be effectively removed when an interchangeable lens (objective) is mounted on the camera body.

BACKGROUND OF THE INVENTION

Recently, demand for highly developed data processing has become greater as the amount of data to be processed in a photographic camera increases. To meet such demand, information on accessories such as interchangeable objectives (lens assemblies) must be transmitted to an operational circuit in the camera body. In the case of an interchangeable objective, for example, typical information is the fully opened diaphragm value, the fully stopped down diaphragm value, and a preset diaphragm value in the manual mode. In a camera system with which an interchangeable objective including an auto-focus mechanism can be used, additional information such as a signal representing the shortest distance for focussing and a focussing detection signal must also be transmitted to the operational circuit. To meet such demand, U.S. Pat. No. 4,357,089 discloses oppositely paired electrical contacts on the camera mount and the lens mount, which exhibit compactness, maneuverability and other features required for a data transmission mechanism. The disclosure of this patent is incorporated fully herein by reference.

When the data transmission is carried out by these pairs of respectively opposed electrical contacts, each pair is usually constructed for reliable electrical contact so that the one electrical is spring-biased to project through the face of the associated mount, whereas the other electrical contact is flush with or recessed slightly from the face of the associated mount. These pairs of respectively opposed electrical contacts usually include one or more pairs for transmission of information peculiar to said interchangeable objective or the like and a single pair serving to indicate the operational mode of the photographic camera. The last-mentioned pair of electrical contacts is described in the referenced patent as the pair of electrical contacts for changeover between an AUTO photographing mode in which the diaphragm value is automatically controlled and a MANUAL photographing mode in which the diaphragm value is manually set. The changeover contacts may be replaced by a pair of electrical contacts functioning to indicate changeover between a photographing mode in which the diaphragm value or the shutter speed or both can be automatically adjusted and a conventional mechanical photographing mode in which the diaphragm value is adjusted and the shutter is actuated, both in a mechanical manner, to achieve reliable photographing even after the battery source has been consumed to some degree.

Thus, the pairs of respectively opposed electrical contacts include one or more pairs of electrical contacts exclusively for transmission of the information peculiar to the interchangeable objectives or the like and generally a single pair of electrical contacts for mode control, i.e., for transmission of a signal indicative of the operational mode selection. Concerning the last-mentioned pair of electrical contacts for selection of the operational mode, the stationary electrical contact must always be recessed from the face of the associated mount to avoid interference of this contact with the other pairs of electrical contacts as the objective is secured to the camera body. The spring-biased electrical contacts of the pairs of electrical contacts for transmission of information peculiar to the objective are installed in the same mount as the stationary electrical contact of the pair of electrical contacts for mode control, in order to avoid interference of the former contacts with the latter.

To achieve the necessary data transmission through these pairs of respectively opposed electrical contacts, it is essential that each pair of opposed electrical contacts be reliably brought into mutual physical and electrical contact. However, foreign substances produced due to environmental conditions, particularly fragments of insulator, often cling to or accumulate on the effective surfaces of each pair of opposed electrical contacts or in recesses defined by these electrical contacts and thereby adversely affect the electrical conduction between each pair of electrical contacts, resulting in unreliable transmission of information.

Accordingly, it is important to remove any foreign substances deposited on the electrical contacts. However, it is not practical to force the user to remove such foreign substances every time the user mounts an interchangeable objective on the camera body. Further, when foreign substances accumulate in the recesses defined by the electrical contacts in the mount, a suitable cleaning implement for removing such foreign substances would likely be necessary, since the electrical contacts are so small in size, but providing such a cleaning implement is not practical.

SUMMARY OF THE INVENTION

According to the invention, foreign substances deposited on the electrical contacts of the lens and/or camera mounts of a camera having interchangeable lenses are automatically removed as the interchangeable lens is secured to the camera body. Specifically, a camera has a camera body with an electrically conductive camera mount and an interchangeable lens with a lens mount. The lens mount is secured to the camera body by rotation of the lens mount relative to the camera body with flat surfaces of the lens mount and the camera mount in abutting relationship. A first electrical contact in the lens mount is movable normal to the flat surface thereof. A spring urges the first contact out of the flat surface of the lens mount. A stationary second electrical contact in the camera mount opens toward the flat surface thereof without protrusion in alignment with the first contact when the lens mount is secured to the camera mount so the first contact normally bears against the second contact. The second contact is insulated from the camera body. The second contact is alternately connected and disconnected electrically to and from the camera mount through the first contact. A plurality of third contacts in the camera mount are movable normal to the flat surface thereof. Springs individually urge the third contacts out of the flat surface of the camera mount. One or more stationary insulative regions in the lens mount open toward the flat surface thereof without protrusion in alignment with one or more of the respective third contacts so the one or more of the respective third contacts bear against the respective one or more insulative regions when the lens mount engages the camera mount. Responsive to rotation of the lens mount as the lens mount is secured to the camera mount, foreign matter is wiped from the second contact, preferably by an insulative surface on the lens mount that bears against the second contact ahead of the first contact in the path of rotation of the lens mount.

A feature of the invention is the capability of disabling the insulative wiping surface when the second contact is connected to the camera mount. This reduces wear by bringing the insulative wiping surface into play only when the first contact is unavailable for wiping foreign matter from the second contact, as can be the case, for example, in the MANUAL mode.

In one embodiment, the wiping surface is formed by a rigid pin in the lens mount movable normal to the flat surface thereof and a spring for urging the pin out of the flat surface of the lens mount so as to bear against the second contact as the lens mount is secured to the camera mount.

In another embodiment, the wiping surface comprises a resilient pin captured in a cavity in the lens mount so as to bear against the second contact and retract under its own resiliency as the lens mount is secured to the camera body.

In another embodiment, the wiping surface is formed by a pin having a brushlike head in the lens mount movable normal to the flat surface thereof and a spring for urging the pin out of the flat surface of the lens mount so as to bear against the second contact as the lens mount is secured to the camera mount.

BRIEF DESCRIPTION OF THE DRAWINGS

The features of specific embodiments of the best mode contemplated of carrying out the invention are illustrated in the drawings, in which:

FIG. 5 is a sectional view of the lens barrel schematically showing the electrical contacts in the MANUAL photographing mode;

FIG. 6 is a sectional view of the camera body schematically showing the electrical contacts corresponding to the contacts shown in FIG. 5, which are represented by phantom lines;

FIG. 7 is a sectional view of the lens barrel schematically showing the electrical contacts together with the embodiment of the wiping surface shown in FIG. 4;

FIG. 8 is a sectional view of the camera body schematically showing the electrical contacts shown in FIG. 6 in relationship to the wiping surface of FIG. 7, which is represented in phantom lines, during rotation of the lens barrel;

FIGS. 9A and 9B are sectional views schematically showing another embodiment of a contact wiping surface;

FIGS. 10A and 10B are sectional views schematically showing still another embodiment of a contact wiping surface;

FIG. 11 is a sectional view schematically showing the electrical contacts on the camera body with a retractable contact wiping surface in the MANUAL photographing mode;

FIG. 12 is the same structure as FIG. 11 in the AUTO photographing mode;

FIG. 13 is a sectional view schematically showing the contacts on the camera body and the contact wiping surface of the lens barrel, which is shown in phantom lines, during rotation of the lens mount as the lens barrel is secured on the camera in the MANUAL photographing mode;

FIG. 14 is a sectional view schematically showing the contacts on the camera body and the corresponding contacts on the lens barrel, which are represented by phantom lines, after the lens barrel is mounted on the camera body in the AUTOMATIC photographic mode; and FIG. 15 is a sectional view of a brushlike contact wiping surface substitutable for the contact wiping surface shown in FIGS. 11 through 14.

DETAILED DESCRIPTION OF THE SPECIFIC EMBODIMENTS

Figure 1:
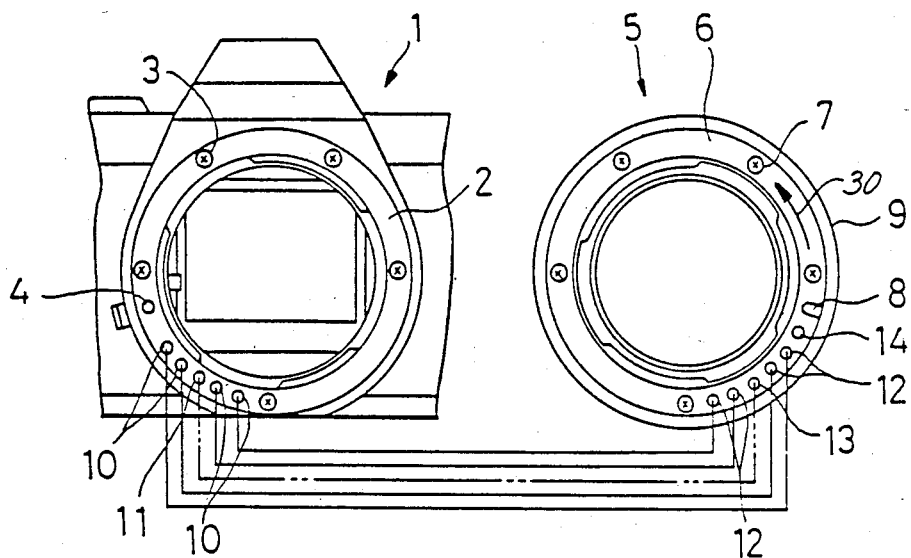
FIG. 1 is a partial front view of a camera body and a lens barrel as viewed from the camera body.

FIG. 1 illustrates a camera body 1 in a front view together with a lens barrel (objective) 5 also in a front view as seen from the camera body. Referring to FIG. 1, the camera body 1 is provided with a camera body mount 2 of electrically conductive material integrally connected thereto by means of screws 3 and the lens barrel 5 is provided with a lens mount 6 also of electrically conductive material integrally connected thereto by means of screws 7.

Body mount 2 and lens mount 6 include a plurality of electrical contacts arranged in pairs, each pair of contacts being in opposed and associated relationship with one another. These pairs of electrical contacts comprise the pair of electrically conductive contacts 11, 13 serving to, as previously mentioned, indicate and control the mode in which a desired operation of photographing is to be performed and one or more pairs of contacts 10, 12 serving to transmit information concerning the specific diaphragm values (fully opened diaphragm value, fully stopped down diaphragm value) and the like which are peculiar to the individual objective to the camera body in the form of electrical current or other electrical signal governed by electrical factors such as resistance values. For convenience of explanation, it is assumed that mode control contacts 11, 13 are utilized for changeover between an AUTO photographic mode and a MANUAL photographing mode.

The lens barrel 5 is secured in a well-known manner to the camera body 1 through a bayonet coupling by rotation of lens mount 6 relative to body mount 2 with mounts 2 and 6 in abutting relationship. At the final step of this coupling operation, a lock pin 4 normally biased to project above the plane of the body mount 2 is fitted into a lock groove 8 formed in the lens mount 6 to lock the lens barrel 5 in place on the camera body. In this position, the pairs of electrical contacts are respectively aligned in confronting electrically contacting relationship. Reference numeral 9 designates a rotatable photographing mode selector ring for indication of photographing mode changeover and generally serving also as a diaphragm preset ring. Reference number 14 designates a pin for removal of deposits constructed in accordance with the present invention.

Figure 2:
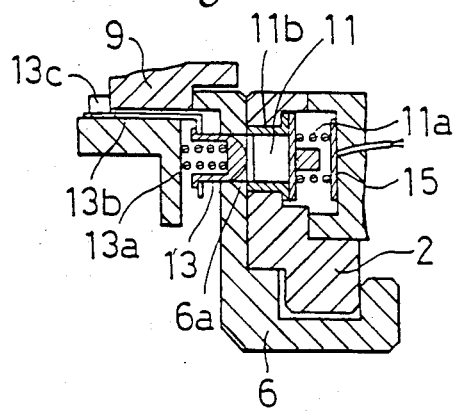
FIG. 2 is a fragmentary sectional view of the camera body and lens barrel of FIG. 1 showing the relative relationship of the mode control contact pair in the MANUAL photographing mode.
Figure 3:
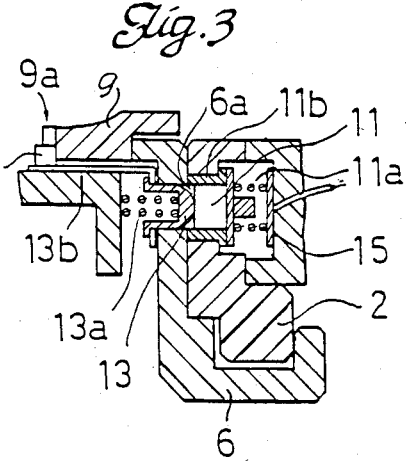
FIG. 3 is a fragmentary sectional view of the camera body and lens barrel of FIG. 1 showing the relative relationship of the mode control contact pair in the AUTO photographing mode.

FIGS. 2 and 3 illustrate, in axial section, the mode control contacts, FIG. 2 representing the MANUAL mode of photographing and FIG. 3 representing the AUTO mode of photographing. The control contact 11 on the camera body is insulated from the body mount 2 by an insulating collar 11b. An electrically conductive spring 11a biases a foot portion of the contact 11 so that said contact 11 is held in the collar 11b. A base plate 15 is electrically connected to the contact 11 by means of the spring 11a. The base plate 15 is connected to an electrical operational circuit (not shown) within the camera body. The outer end surface of the contact 11 is recessed from the face of the body mount 2. In opposition to control contact 11, which is essentially stationary, the control contact 13 in the lens mount 6 is slidably inserted into a hole 6a formed in the lens mount 6 and biased by a spring 13a to project from said lens mount 6. This control contact 13 is captured in an opening formed in one leg of an L-shaped changeover plate 13b so that said changeover plate 13b may be translationally displaced to control the electrical connection between the contacts 11, 13.

As best seen in FIGS. 5 and 7 showing the electrical contacts in an idealized flat section as viewed in the circumferential direction around the optical axis of the lens barrel 5, a pin 13c planted on the other leg of said changeover plate 13b slidably rides on an edge region 9b of mode selector ring 9 (serving also as the diaphragm present ring, in general) so as to hold the contact 13 in its retracted position. Such state is shown by a solid line in FIG. 7. At its edge corresponding to the AUTO mode selection, selector ring 9 has an edge region 9a with a V-shaped groove that releases pin 13c (as shown by a phantom line in FIG. 7) so contact 13 is free to bear against the contact 11 in the AUTO photographing mode.

Figure 4:
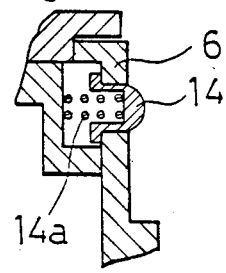
FIG. 4 is a fragmentary sectional view showing one embodiment of a wiping surface in accordance with the invention.

FIG. 4 illustrates pin 14 in section. As lens barrel 5 rotates during its mounting on camera body 1, pin 14 functions to remove foreign substances or deposits such as fragments of insulators and conductors clinging to the electrical contact 11 embedded in the mount at a level lower than the mount face and accumulated in the recess defined by said contact 11 in the mount. Pin 14 should be located in the lens mount 6 ahead of any other electrical contacts in the direction of rotation designated 30 (FIGS. 1 and 7), particularly the projecting electrical contact 13 for mode control. FIG. 4 illustrates by way of an example the manner in which the pin 14 is biased by a spring 14a to project from lens mount 6. It is preferred that pin 14, which includes the biasing spring 14a associated with pin 14 and the space in which said baising spring 14a is located, should be identical or similar to the other electrical contacts from the view point of working efficiency for incorporating a plurality of relatively small electric contacts into the mounts, except that the pin 14, at least the head thereof, should be insulated to avoid any possible electrical interference with the electrical contact 11 for mode control in the body mount.

The data transmission contacts 12 located on the lens mount 6 may comprise conductive or insulating material embedded in corresponding positions, as shown in FIG. 5, provided that the data transmission is achieved in the form of digital signals. The lens mount 6 itself may serve as the conductive contacts 12, assuming the lens mount 6 is made of conductive material, and recesses in the lens mount 6 may provide the insulating regions of the insulating contacts 12. Details of such arrangement are disclosed by the previously referenced patent.

As best seen in FIG. 6, each data transmission contact 10 mounted on the camera body 1 is insulated from the body mount 2 by a collar 10b, normally biased by a spring 10a to project through the face of said body mount 2, and electrically connected by said spring 10a to an associated base plate 20. Two phantom lines in FIG. 6 show the contacts on the lens mount after the objective has been mounted in the camera body.

FIG. 7 illustrates the positional relationship of the pin 14 relative to the mode control contact 13. The pin 14 is constructed as shown in FIG. 4.

FIG. 9a illustrates another embodiment of the pin for removal of deposits. In this embodiment, a pin 16 for removal of depositions comprises a resilient body captured in a cavity 31 that opens to the surface of lens mount 6. Pin 16 projects out of the cavity 31 away from the surface of lens mount 6 and can retract under its own resiliency, so that the spring 14a as employed in the previous embodiment of FIG. 5 is unnecessary. FIG. 10a illustrates a further embodiment of the pin for removal of deposits, in which a pin 17 for removal of deposits has a brushlike head biased by a spring 17a to project through the lens mount 6. A more efficient removal of deposits is achieved by such brushlike head than the embodiments of FIGS. 4 and 9a.

The manner in which the pin for removal of deposits functions will now be described with reference to FIGS. 6, 7, and 8. When the lens barrel 5 is rotated in the direction indicated by arrow 30 in FIG. 7 to mount the objective on the camera body, the pin 14 falls for an instant in the recess defined by the mode control contact 11 on the camera body as seen in FIG. 8, prior to alignment thereof with the mode control contact 13 on the lens mount. Then pin 14 leaves the recess as the lens barrel 5 is further rotated, and finally an alignment of the electrical contact 11 with the electrical contact 13 is established, as shown by FIG. 6. In this position, the lock pin 4 of the camera body is engaged in the lock groove 8 of the objective to prevent further rotation of the lens barrel 5 and the mounting of the objective on the camera body is completed. In this way, the pin 14 follows the surface of the electrical contact 11 on the camera body during mounting of the objective to the camera body, thereby wiping this surface clean. In consequence, any foreign substances possibly clinging to the electrical contacts on mount 2 are effectively removed.

The described effect is reliably achieved regardless of whether the changeover ring 9 has been set to the AUTO photographing mode in which the mode control contact 13 is in its projecting position or changeover ring 9 has been set to the MANUAL photographing mode in which mode control contact 13 is in its retracted position. Without provision of the pin 14 for removal of deposits, the mode control contact 13 is in its projecting position when the objective is coupled to the camera body in the AUTO photographing mode, so that the mode control contact 13 itself serves to remove to a certain extent foreign substances which may be clinging to the surface of the mode control contact 11 and assures desired contact with the contact 11. However, when the photographing mode is changed over to the AUTO photographing mode after the objective has been coupled to the camera body in the MANUAL photographing mode, it may occur that the foreign substances remain on the surface of the mode control contact 11 after the objective has been mounted on the camera body. In such a case, it is difficult to assure the electrical connection between the mode control contacts 11 and 13 and sometimes it may be necessary to remove the objective and remount it on the camera body. Such situation can be effectively avoided by the pins 14, 16, and 17 for removal of deposits constructed in accordance with the present invention.

The mode control contact 13 and the data transmission contacts 12 on the objective slide across the data transmission contacts 10 on the camera body while the latter slide across the data transmission contacts 12 and the lens mount 6 as the lens rotates forward during its mounting on the camera body. Even if any foreign substances cling to these electrical contacts prior to mounting of the objective to the camera body, therefore, the sliding rotation of the objective as has been mentioned above effectively removes the foreign substances and thereby avoids a problem in establishing the electrical connections. This is also true in the AUTO condition.

The embodiment as illustrated by FIG. 9a employs the pin for removal of deposits comprising a resilient member and, as a result, eliminates provision of a spring biasing this pin to project through the mount 6. Specifically, as best seen in FIG. 9b, the pin 16 deforms itself and thereby slides on the surface of the mode control contact 11 of the body mount to remove any deposits possibly present thereon, as the object is rotated to be mounted to the camera body. The embodiment illustrated by FIG. 10a employs the brushlike head of the pin for deposit removal to improve the removal efficiency. FIG. 10b shows the pin 17 as falling in the recess defined by the mode control contact 11.

In the embodiments as have been described hereinabove, the pin for deposit removal is mounted in the lens mount since the contacts defining the recesses are mounted in the body mount in these embodiments. Such relationship can of course be reversed.

Also, concerning the pairs of data transmission contacts 10, 12, if the stationary contacts 12 are configured so as to be retracted from the mount face, the corresponding mount, i.e., mount 2, may be provided with a pin for removal of deposits similar to those in the previously described embodiments to remove the foreign substances accumulated in the recesses defined by said stationary contacts 12.

In the modified form of the invention shown in FIGS. 11 and 12, the pin 14 is captured in an opening formed in one leg of an L-shaped translationally displaceable changeover plate 14b, as in the case of the electrical contact 13, and a pin 14c is plated on the other leg of changeover plate 14b. A portion of the selector ring 9, adjacent to pin 14c has an edge region 9c that releases pin 14c to bear against whatever is in its path, i.e., contact 12, when the MANUAL photographing mode has been selected, and has a wider edge region 9d against which pin 14c slideably bears when the AUTO photographing mode has been selected. The widths of both edge regions 9c, 9d are such that, in the MANUAL photographing mode, pin 14 projects through the face of the mount 6 but, in the AUTO photographing mode, pin 14 is flush with or retracted from the face of the mount 6. This relationship is the inverse of the relationship between the edge regions 9b, 9a and mode control contact 13. In consequence, the pin 14 is retracted when the contact 13 projects and the pin 14 projects when the contact 13 is retracted. As before, the head of the pin 14 is insulative in order to avoid any electrical interference with the mode control contact 11 on the camera body.

FIGS. 13 and 14 illustrate the modified form of the invention shown in FIGS. 11 and 12 together with the camera body. FIG. 13 illustrates the camera body and objective while the objective is being rotated in the MANUAL photographing mode during the mounting process; pin 14 engages and wipes across the surface of mode control contacts 11. FIG. 14 illustrates the camera body and objective in the AUTO photographing mode after the completion of the objective mounting process; mode control contact 13 engages mode control contact 11.

FIG. 15 shows another embodiment of the deposit remover pin in which a head 17 of the pin is formed in a brushlike head to improve the efficiency of deposit removal. This embodiment is similar to those as shown by FIGS. 11 and 12 in so far as the pin is under biasing effect of the spring 14a and under changeover control by the changeover plate 14b.

When the objective is mounted on the camera body under selection of the MANUAL photographing mode (FIG. 11), the mode control contact 13 on the objective is in its retracted position, whereas the deposit remover pin 14 is in its projecting position. In the course of the objective mounting process, the deposit remove pin 14 falls in the recess defined by the mode control contact 11 on the camera body in advance of the mode control contact 13 on the objective, as seen in FIG. 13, then leaves this recess as the lens barrel 5 is further rotated until an alignment of the contact 11 with the contact 13 is established, as seen in FIG. 14. The lock pin 4 of the camera body then engages lock groove 8 of the objective to prevent further rotation of the lens barrel 5 and the mounting of the objective to the camera body is completed. In this way, the pin 14 wipes across the surface of the electrical contact 11 on the camera body as the objective is mounted on the camera body and, in consequence, any foreign substances possibly clinging thereto are effectively swept away. Without pin 14, there could be foreign matter present between the mode control contacts 11, 13 after the objective has been completely mounted on the camera body. In such a case, it would be difficult to assure an electrical connection between the mode control contacts 11, 13, and to obtain reliable operation of the camera, in the AUTO photographing mode. Thus, the invention insures reliable operation as the AUTO mode is later introduced.

When the objective is mounted on the camera body under selection of the AUTO photographing mode (FIG. 12), the mode control contact 13 on the objective is in its projecting position, so that this mode control contact 13 itself can remove any foreign matter and assure a reliable contact with the corresponding contact 11. Thus, in the modified form of the invention, the deposit remover pin 14 is maintained in its retracted position during the AUTO photographing mode, in order to avoid unnecessary frictional wear of this deposit remover pin.

The mode control contact 13 and the data transmission contacts 12 on the objective slide on the data transmission contacts 10 on the camera body during rotation of the lens as it is mounted on the camera body. Even if any foreign matter is clinging to these electrical contacts before the objective is mounted on the camera body, therefore, the described sliding rotation of the objective effectively wipes the foreign matter off the contacts and thereby avoids a problem in the electrical connections whether the AUTO mode or the MANUAL mode has been selected.

When the electrical contacts on both mounts carry foreign substances sufficiently large to be visually detected, it will be easy to remove them. However, the foreign substances which are fine can be detected only by use of a microscope or the like. In consequence, it is often difficult to judge whether cleaning is necessary or not and a cleaning, if necessary, would also be a burden to the user of the camera.

Therefore, it is an important advantage achieved by the present invention that the foreign substances possibly clinging to the contacts are removed only by the act of mounting the objective to the camera body, which is a step already necessary to change objectives. In other words, the contacts are cleaned without any extra steps being taken by the user.

The construction needed for practicing the principles of the present invention simply comprises an additional hole formed in the lens mount and a small pin slideably fitted into this hole and, in some cases, a spring biasing this pin to project through the mount and means for changing over the pin between a retracted state and a projecting state. These parts are relatively low in cost and easily incorporated into a limited space, imposing no burden on manufacturing.

In the case of the modified form of the invention, as an additional feature, the deposit remover pin is adapted to function only when it is necessary to remove any deposits, avoiding any unnecessary frictional wear of this pin.

Briefly, the device according to the present invention is generally useful in association with the pairs of electrical contacts including the contacts recessed from the face of the associated mount and having no member adapted to slide on the surface of these retracted contacts, in order to assure the desired electrical connection.

The disclosures of Japanese Utility Model Application Nos. 1984-5307 and 1984-6316, laid open on Aug. 9, 1985 and Aug. 14, 1985, respectively, Gazette No. 1985(Sho60)-118129 and Gazette No. 1985 (Sho)-120440, respectively, attached as Appendices A and B are incorporated fully herein by reference.

What is claimed is:

1. In a camera having a camera body and an interchangeable lens engageable with the camera body, the improvement comprising:
a lens mount having a first flat surface;
an electrically conductive camera mount having a second flat surface;
means for engageably securing the lens mount to the camera mount by rotation of the lens mount relative to the camera mount with the flat surfaces of the lens mount and camera mount in abutting relationship;
a first electrical contact in the lens mount movable normal to the first surface;
spring means for urging the first contact out of the first surface;
a stationary second electrical contact in the camera mount, the second contact opening toward the second surface without protruding therefrom in alignment with the first contact when the lens mount is secured to the camera mount so the first contact normally bears against the second contact;
means for insulating the second contact from the camera body;
means for alternately connecting and disconnecting the second contact electrically to and from the camera mount through the first contact;
a plurality of third contacts in the camera mount movable normal to the second surface;
one or more stationary insulative regions in the lens mount opening toward the first surface without protruding therefrom in alignment with one or more of the respective third contacts so the one or more of the respective third contacts bear against the respective one or more insulative regions when the lens mount engages the camera mount;
means responsive to rotation of the lens mount as the lens mount is secured to the camera mount for wiping foreign matter from the second contact; and
means for disabling the wiping means when the second contact is connected to the camera mount.

2. The improvement of claim 1 in which the connecting and disconnecting means comprises means for alternately retracting the first contact so as to disconnect the second contact electrically from the camera mount and releasing the first contact so it is free to bear against the second contact to connect the second contact electrically to the camera mount.

3. The improvement of claim 1 in which the wiping means comprises a wiping pin in the lens mount movable normal to the first surface, and spring means for urging the wiping pin out of the first surface so as to bear against the second contact as the lens mount is secured to the camera mount and the disabling means comprises means for retracting the wiping pin when the first contact is released and means for releasing the wiping pin when the first contact is retracted.

4. The improvement of claim 2, in which the wiping means has an insulative surface that bears against the second contact.

5. The improvement of claim 4, in which the wiping means is located on the lens mount ahead of the first contact in the path of rotation of the lens mount.

6. The improvement of claim 1, in which the wiping means comprises a cavity in the lens mount and a resilient pin captured in the cavity so as to bear against the second contact and retract under its own resiliency as the lens mount is secured to the camera mount.

7. The improvement of claim 1, in which the wiping means comprises a pin having a brushlike head in the lens mount movable normal to the first surface and spring means for urging the pin out of the first surface so as to bear against the second contact as the lens mount is secured to the camera mount.

8. The improvement of claim 1, additionally comprising a rotatable mode selector ring on the lens, the means for alternately connecting and disconnecting the second contact comprising a changeover plate capturing the first contact and having a follower element biased by the spring means for the first contact to ride on a first edge portion of the mode selector ring as the latter rotates, the first edge portion of the mode selector ring having a first region shaped to retract the first contact and a second region shaped to release the first contact so it is free to bear against the second contact.

9. The improvement of claim 8, in which the wiping means comprises a pin and spring means for biasing the pin out of the first surface located on the lens mount ahead of the first contact in the path of rotation of the lens mount.

10. The improvement of claim 9, additionally comprising another changeover plate capturing the pin and having a follower element biased by the spring means for the pin to ride on a second edge portion of the mode selector ring as the latter rotates, the second edge portion having a third region shaped to retract the pin and a fourth region shaped to release the pin so it is free to bear against the second contact, the first, second, third, and fourth regions being so located with respect to each other that the pin is retracted while the first contact is released and the pin is released while the first contact is retracted.

11. The improvement of claim 10, in which the first region is flat, the second region is notch-shaped, the third region is flat, and the fourth region is flat, the fourth region being thinner than the third region.

12. An interchangeable lens comprising:
a lens barrel;
a lens mount having a flat surface on one end of the barrel;
a first electrical contact in the lens mount movable normal to the flat surface between a retracted position approximately flush with the flat surface and an extended position projecting from the flat surface;
means for alternately positioning the first contact in the retracted position and releasing the first contact to move toward its extended position;
one or more stationary insulative regions in the lens mount opening toward the flat surface without protruding therefrom;
a pin in the lens mount movable normal to the flat surface between a retracted position approximately flush with the flat surface and an extended position projecting from the flat surface;
spring means for urging the pin toward the extended position; and
means for alternately positioning the pin in its retracted position when the first contact is released and releasing the pin to move toward its extended position when the first contact is in the retracted position.

13. The lens of claim 12, in which the pin has an insulative head.

14. The lens of claim 12, in which the pin has a brush-like head.

15. The lens of claim 12, additionally comprising a rotatable mode selector ring, the means for alternately positioning the first contact comprising a changeover plate capturing the first contact and having a follower element biased by the spring means for the first contact to ride on a first edge portion of the mode selector ring as the latter rotates, the first edge portion of the mode selector ring having a first region shaped to retract the first contact and a second region shaped to release the first contact so it is free to move toward its extended position.

16. The improvement of claim 15, additionally comprising another changeover plate capturing the pin and having a follower element biased by the spring means for the pin to ride on a second edge portion of the mode selector ring as the latter rotates, the second edge portion having a third region shaped to retract the pin and a fourth region shaped to release the pin so it is free to bear against the second contact, the first, second, third, and fourth regions being so located with respect to each other that the pin is retracted while the first contact is released and the pin is released while the first contact is retracted.

17. An interchangeable lens comprising:
a lens barrel;
a lens mount having a flat surface on one end of the barrel;
a first electrical contact in the lens mount movable normal to the flat surface between a retracted position approximately flush with the flat surface and an extended position projecting from the flat surface;
spring means for urging the first contact toward the extended position;
means for alternately positioning the first contact in the retracted position and releasing the first contact to move toward its extended position;
one or more stationary insulative regions in the lens mount opening toward the flat surface without protruding therefrom; and
a cavity in the lens barrel and a resilient pin captured in the cavity so as to extend from the flat surface and retract under its own resiliency.

18. In a camera having a camera body and an interchangeable lens engageable with the camera body, the improvement comprising
a lens mount having a first flat surface;
an electrically conductive camera mount having a second flat surface;
means for engageably securing the lens mount to the camera mount by rotation of the lens mount relative to the camera mount with the flat surfaces of the lens mount and camera mount in abutting relationship;
a first electrical contact in the lens mount movable normal to the first surface;
spring means for urging the first contact out of the first surface;
a stationary second electrical contact in the camera mount, the second contact opening toward the second surface without protruding therefrom in alignment with the first contact when the lens mount is secured to the camera mount so the first contact normally bears against the second contact;
means for insulating the second contact from the camera body;
means for alternately connecting and disconnecting the second contact electrically to and from the camera mount through the first contact;
a plurality of third contacts in the camera mount movable normal to the second surface;
spring means for individually urging the third contacts out of the second surface;
one or more stationary insulative regions in the lens mount opening toward the first surface without protruding therefrom in alignment with one or more of the respective third contacts so the one or more of the respective third contacts bear against the respective one or more insulative regions when the lens mount engages the camera mount; and
means responsive to rotation of the lens mount as the lens mount is secured to the camera mount for wiping foreign matter from the second contact, the wiping means having an insulative surface that bears against the second contact.

* * * * *